US010505476B2

(12) United States Patent
Yajima et al.

(10) Patent No.: US 10,505,476 B2
(45) Date of Patent: Dec. 10, 2019

(54) CONTROL DEVICE AND CONTROL METHOD OF ROTARY ELECTRIC MACHINE

(71) Applicant: HONDA MOTOR CO., LTD., Minato-ku, Tokyo (JP)

(72) Inventors: Shigeo Yajima, Tochigi-ken (JP); Makoto Tanaka, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/049,856

(22) Filed: Jul. 31, 2018

(65) Prior Publication Data

US 2019/0052203 A1    Feb. 14, 2019

(30) Foreign Application Priority Data

Aug. 10, 2017 (JP) .................................. 2017-155228

(51) Int. Cl.
| | |
|---|---|
| *H02P 6/28* | (2016.01) |
| *B60L 3/00* | (2019.01) |
| *H02P 6/16* | (2016.01) |
| *B60L 15/20* | (2006.01) |
| *H02P 27/08* | (2006.01) |
| *H02P 6/10* | (2006.01) |
| *H02P 6/15* | (2016.01) |

(52) U.S. Cl.
CPC .............. *H02P 6/28* (2016.02); *B60L 3/0061* (2013.01); *B60L 15/20* (2013.01); *H02P 6/10* (2013.01); *H02P 6/157* (2016.02); *H02P 6/16* (2013.01); *H02P 27/085* (2013.01)

(58) Field of Classification Search
CPC .... H02P 6/16; H02P 6/10; H02P 6/157; H02P 6/28; B60L 15/20; B60L 2210/40; B60L 2220/14; B60L 2240/12; B60L 3/0061
See application file for complete search history.

(56) References Cited

U.S. PATENT DOCUMENTS

| | | | |
|---|---|---|---|
| 7,518,334 B2 * | 4/2009 | Hochhausen | ............. H02P 6/16 318/599 |
| 8,692,492 B2 * | 4/2014 | Sato | .......................... H02P 6/06 318/400.12 |
| 10,326,388 B2 * | 6/2019 | Lee | ......................... H02P 6/157 |
| 2008/0051959 A1 | 2/2008 | Ishihara et al. | |

(Continued)

FOREIGN PATENT DOCUMENTS

| | | |
|---|---|---|
| JP | 2005-247574 | 9/2005 |
| JP | 4587051 | 3/2008 |

(Continued)

OTHER PUBLICATIONS

Japanese Office Action for Japanese Patent Application No. 2017-155228 dated Feb. 26, 2019.

*Primary Examiner* — Thai T Dinh (74) *Attorney, Agent, or Firm* — Amin, Turocy & Watson, LLP (57) ABSTRACT

A motor control device performs rotation control of a motor by supplying a driving waveform to an inverter circuit. The motor control device determines the amount of modulation in accordance with an induced voltage of the motor based on a calculated interpolation angle, and generates the driving waveform by performing pulse modulation by this amount of modulation.

6 Claims, 11 Drawing Sheets

(56) References Cited

U.S. PATENT DOCUMENTS

| | | | |
|---|---|---|---|
| 2009/0167224 A1 | 7/2009 | Miura et al. | |
| 2010/0123418 A1* | 5/2010 | Itoh | H02P 21/0089 318/400.02 |
| 2014/0340007 A1 | 11/2014 | Suhama et al. | |
| 2015/0073745 A1* | 3/2015 | Mizuno | G01P 3/44 702/147 |

FOREIGN PATENT DOCUMENTS

| | | |
|---|---|---|
| JP | 5368777 | 6/2010 |
| JP | 2011-259606 | 12/2011 |
| JP | 5502605 | 12/2011 |
| JP | 5310815 | 1/2012 |
| JP | 5781875 | 4/2013 |
| JP | 2013-255328 | 12/2013 |

\* cited by examiner

CONTROL DEVICE AND CONTROL METHOD OF ROTARY ELECTRIC MACHINE

CROSS-REFERENCE TO RELATED APPLICATION

This application is based upon and claims the benefit of priority from Japanese Patent Application No. 2017-155228 filed on Aug. 10, 2017, the contents of which are incorporated herein by reference.

BACKGROUND OF THE INVENTION

Field of the Invention

The present invention relates to a control device and a control method for performing rotation control of a rotary electric machine.

Description of the Related Art

Heretofore, a control device that performs rotation control of a rotary electric machine including a motor has been known. For example, various techniques for suppressing generation of an inrush current or torque ripple in a low-speed rotation region have been proposed.

In Japanese Patent No. 5502605, a control device that makes up for a deficiency of angular resolution due to the number of Hall sensors, by interpolating the positions of magnetic poles (that is, the angle of rotation) of a rotor when performing rotation control of a brushless motor by using a plurality of Hall sensors is proposed.

SUMMARY OF THE INVENTION

However, with the device proposed in Japanese Patent No. 5502605, there is a possibility that, even when the amount of sinusoidal pulse modulation is provided, a planned output (that is, a sinusoidal waveform) cannot be obtained because of a transient phenomenon unique to the characteristics of the rotary electric machine or the control device. Thus, concerning the device proposed in Japanese Patent No. 5502605, there is still a lot of room for improvement in terms of the design of an output waveform.

The present invention has been made to solve the above-described problem, and an object thereof is to provide a control device and a control method of a rotary electric machine, in which it is possible to design output characteristics as planned while achieving simplification of a circuit configuration and a reduction in cost of the device.

A control device of a rotary electric machine according to a first aspect of the present invention is a device that performs rotation control of the rotary electric machine by supplying a driving waveform to an inverter circuit. The control device includes: a plurality of rotation angle sensors fixedly disposed along the rotational direction of the rotary electric machine and configured to output detection signals in accordance with the angle of rotation of the rotary electric machine; an interpolation angle calculating unit configured to calculate an interpolation angle indicating the angle of rotation by interpolating a discrete angular level which is identified based on combination of the detection signals obtained by the plurality of rotation angle sensors; a modulation amount determining unit configured to determine the amount of modulation based on the interpolation angle calculated by the interpolation angle calculating unit; and a driving waveform generating unit configured to generate the driving waveform by performing pulse modulation by the amount of modulation determined by the modulation amount determining unit. Further, the modulation amount determining unit determines the amount of modulation in accordance with an induced voltage of the rotary electric machine.

As described above, since the amount of modulation for the driving waveform is determined depending on the induced voltage of the rotary electric machine, the induced voltage, which is highly correlated with output characteristics, can be reflected in the amount of modulation. Thus, it is possible to design the output characteristics as planned, while achieving simplification of a circuit configuration and a reduction in cost of the device. That is, it is possible to improve the controllability of the rotary electric machine without adopting an expensive device configuration (adding a high-resolution position sensor, for example).

Moreover, the control device may further include a map storing unit configured to store a modulation amount map having the interpolation angle as an input variable and the amount of modulation as an output variable, and the modulation amount determining unit may determine the amount of modulation by reading the modulation amount map from the map storing unit and referring to the modulation amount map. By reading the modulation amount map stored in advance and referring to the modulation amount map, it is possible to obtain the amount of modulation directly without performing calculation every single time.

Furthermore, the map storing unit may store the modulation amount map generated based on the frequency characteristics of the induced voltage.

A control method of a rotary electric machine according to a second aspect of the present invention is a method of performing rotation control of the rotary electric machine by supplying a driving waveform to an inverter circuit. The control method includes the steps of: acquiring detection signals in accordance with an angle of rotation of the rotary electric machine by using a plurality of rotation angle sensors fixedly disposed along a rotational direction of the rotary electric machine; calculating an interpolation angle indicating the angle of rotation by interpolating a discrete angular level which is identified based on combination of the detection signals obtained by the plurality of rotation angle sensors; determining an amount of modulation based on the calculated interpolation angle; and generating the driving waveform by performing pulse modulation by the determined amount of modulation. Further, in the determining step, the amount of modulation is determined in accordance with an induced voltage of the rotary electric machine.

Moreover, the control method may further include the step of storing a modulation amount map having the interpolation angle as an input variable and the amount of modulation as an output variable. Further, in the determining step, the amount of modulation may be determined by reading the stored modulation amount map and referring to the modulation amount map.

Furthermore, in the storing step, the modulation amount map generated based on frequency characteristics of the induced voltage may be stored.

With the control device and the control method of the rotary electric machine according to the present invention, it is possible to design output characteristics as planned while achieving simplification of a circuit configuration and a reduction in cost of the device. That is, it is possible to improve the controllability of the rotary electric machine without adopting an expensive device configuration (adding a high-resolution position sensor, for example).

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a control device of a rotary electric machine according to the present invention will be described with reference to the attached drawings in connection with a control method of the rotary electric machine.

[Application Example of Motor Control Device 18]

<Configuration of Automated Guided Vehicle 10>

Figure 1:
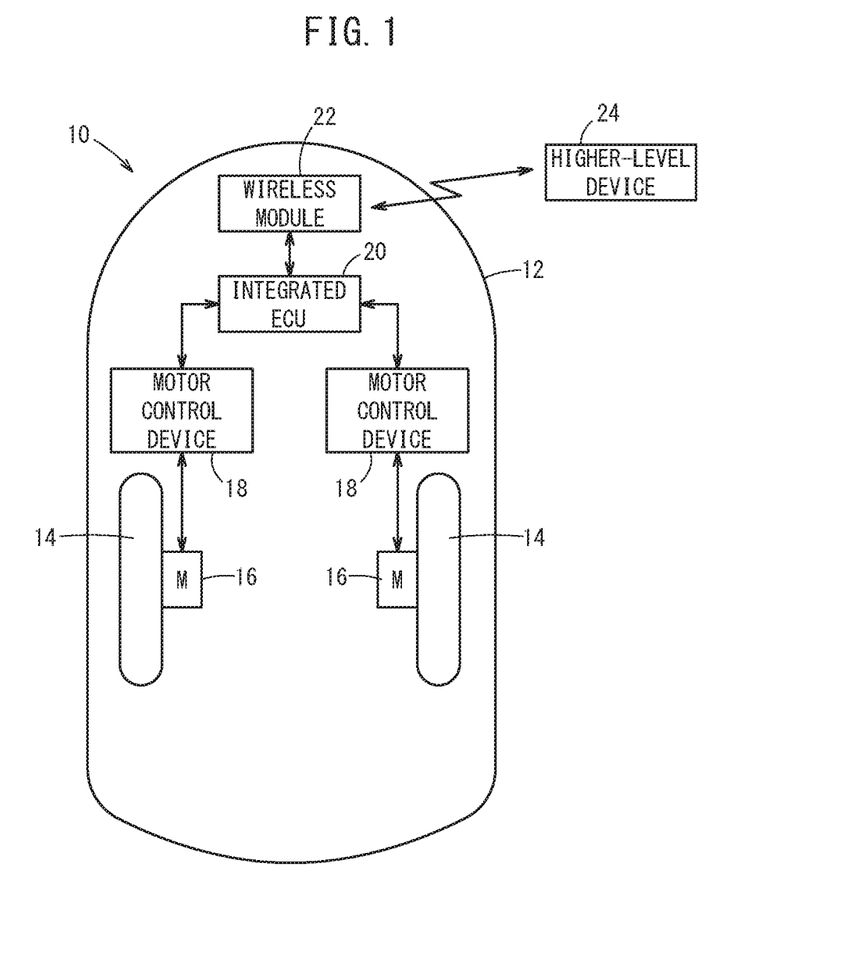
FIG. 1 is a schematic plan view of an automated guided vehicle into which a control device of a rotary electric machine according to an embodiment of the present invention is incorporated.

FIG. 1 is a schematic plan view of an automated guided vehicle 10 into which a control device (here, a motor control device 18) of a rotary electric machine according to an embodiment of the present invention is incorporated. The automated guided vehicle 10 is an unmanned conveyance carrier (an automated guided vehicle), and supplies and conveys various items in a factory, including parts, products in process, or finished products.

Specifically, this automated guided vehicle 10 is configured to include a vehicle body 12, right and left wheels 14 and 14, right and left motors 16 and 16 (rotary electric machines), right and left motor control devices 18 and 18, an integrated electronic control unit (ECU) 20, and a wireless module 22.

The integrated ECU 20 receives a command signal from a higher-level device 24 via the wireless module 22, and controls components of the automated guided vehicle 10 based on this command signal. Specifically, the integrated ECU 20 generates right and left speed command values based on the command signal from the higher-level device 24 and the travelling behavior of the automated guided vehicle 10, and supplies control signals including the speed command values to the right and left motor control devices 18 and 18.

The right-side motor control device 18 rotates the right wheel 14 at a desired rotational speed by performing rotation control of the right motor 16 based on the control signal from the integrated ECU 20. Likewise, the left-side motor control device 18 rotates the left wheel 14 at a desired rotational speed by performing rotation control of the left motor 16 based on the control signal from the integrated ECU 20.

<Overall Configuration of Motor 16>

Figure 2:
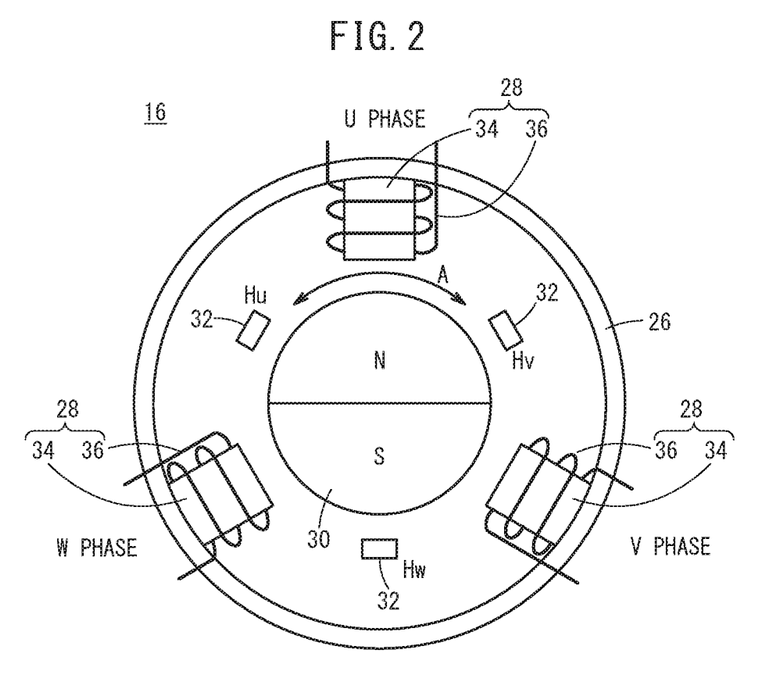
FIG. 2 is a sectional view schematically depicting principal portions of the motor of FIG. 1.

FIG. 2 is a sectional view schematically depicting principal portions of the motor 16 depicted in FIG. 1. This motor 16 is a three-phase brushless motor including a housing 26 in the shape of a hollow circular cylinder, three stators 28 which are provided on an inner wall of the housing 26, a circular cylindrical rotor 30 which is formed of a permanent magnet, and three Hall sensors 32 (rotation angle sensors).

Each of the U-phase, V-phase, and W-phase stators 28 includes a slot 34 and a stator coil 36 wound around the slot 34. The rotor 30 is formed of a permanent magnet having one set of magnetic poles (N pole and S pole), and configured so as to be capable of rotating in a clockwise or counterclockwise direction.

Each Hall sensor 32 is a noncontact magnetic sensor that detects change in the positions of the magnetic poles caused by the rotation of the rotor 30. The Hall sensors 32 are fixedly disposed at equiangular intervals in the rotational direction A of the rotor 30 (the motor 16). Hereinafter, the Hall sensor 32 located between the W-phase and U-phase stators 28 and 28, the Hall sensor 32 located between the U-phase and V-phase stators 28 and 28, and the Hall sensor 32 located between the V-phase and W-phase stators 28 and 28 are referred to respectively as "Hu", "Hv", and "Hw", in some cases.

The configuration of the motor 16 is not limited to the configuration illustrated in FIG. 2, and the motor 16 can adopt any of combinations of [1] an inner rotor type/an outer rotor type, [2] a surface permanent magnet (SPM) type/an interior permanent magnet (IPM) type, [3] the number of phases of the stator 28, [4] the number of slots of the stator 28, or [5] the number of poles (sets of poles) of the rotor 30.

When drive control of the automated guided vehicle 10 (FIG. 1) is performed, a higher level of positional accuracy is, in some cases, required as compared to other products and applications (for example, an electric cart). Specifically, there is a worry that, as a result of variations in control characteristics of the motors 16 in a low-speed rotation region, the synchronization performance of the right and left motors 16 is decreased, resulting in a decrease in the positional accuracy at the time of stop or the straight-running stability at the time of start.

Thus, in the present invention, a control method (so-called pseudo sinusoidal wave control) that is capable of executing rotation control of the motor 16 based on optimally-designed output characteristics even with a relatively inexpensive device configuration such as the motor 16 illustrated in FIG. 2 is proposed.

[Configuration of Motor Control Device 18]
<Block Diagram>

Figure 3:
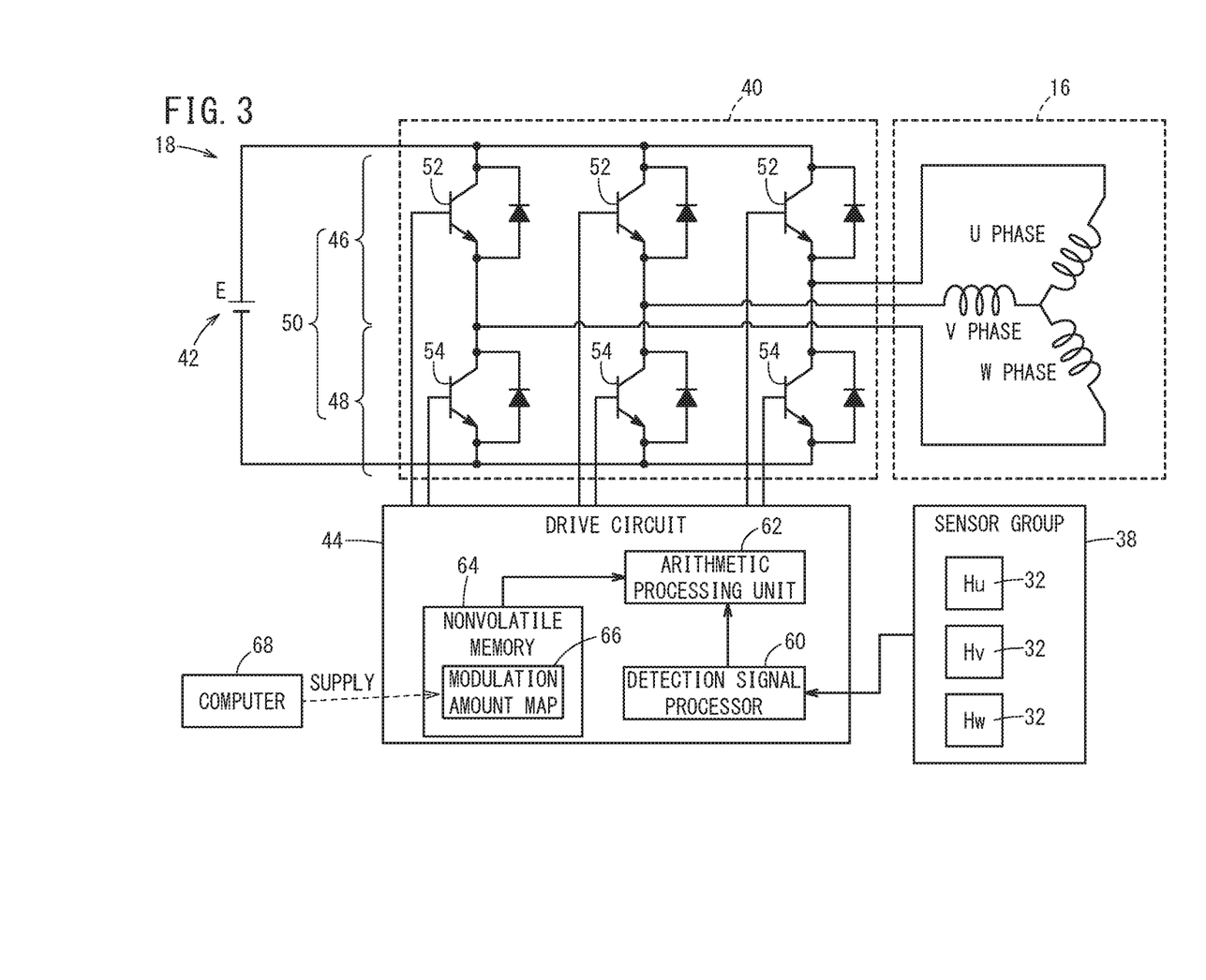
FIG. 3 is an electrical block diagram of the motor control device depicted in FIG. 1.

FIG. 3 is an electrical block diagram of the motor control device 18 depicted in FIG. 1. The motor control device 18 is configured to include an inverter circuit 40, a direct-current power supply 42, and a drive circuit 44.

The inverter circuit 40 is a power supply circuit that converts a direct current into an alternating current. The inverter circuit 40 is configured to include three upper arms 46 corresponding respectively to the U phase, the V phase, and the W phase of the motor 16, and three lower arms 48 corresponding respectively to the U phase, the V phase, and the W phase of the motor 16. Hereinafter, in some cases, the upper arms 46 and the lower arms 48 corresponding to the phases are collectively referred to as upper and lower arms 50.

Each upper arm 46 performs a switching operation (an ON and OFF operation) via a switching element 52. Each lower arm 48 performs a switching operation (an ON and OFF operation) via a switching element 54.

The drive circuit 44 is a control circuit that performs drive control of the inverter circuit 40. Specifically, the drive circuit 44 includes a detection signal processor 60, an arithmetic processing unit 62, and a nonvolatile memory 64 (a map storing unit).

After generating a level signal indicating an angular level from a combination of the detection signals obtained by a sensor group 38, the detection signal processor 60 supplies the level signal to the arithmetic processing unit 62. For example, if the three Hall sensors 32 are disposed as depicted in FIG. 2, the level signal represents six angular levels (the angular resolution is 60 degrees).

The arithmetic processing unit 62 is made up of a central processing unit (CPU) or a micro-processing unit (MPU), and based on the speed command value from an external device (the integrated ECU 20 of FIG. 1), generates and outputs a waveform signal (hereinafter referred to as a "driving waveform") for performing drive control of the inverter circuit 40.

The nonvolatile memory 64 is made up of a semiconductor memory including, for instance, an electrically erasable programmable read-only memory (EEPROM) and a flash memory. In the example of FIG. 3, the nonvolatile memory 64 stores therein a modulation amount map 66, which will be described later.

A computer 68 shown in FIG. 3 is an external general-purpose computer which is configured to include a CPU, a memory, a communication unit, and an input/output device. The computer 68 executes various functions including a function of acquiring a detection signal from a voltage sensor or a current sensor which is connected to the motor 16, a function of generating the modulation amount map 66, and a function of supplying the modulation amount map 66 to the motor control device 18.

Figure 4:
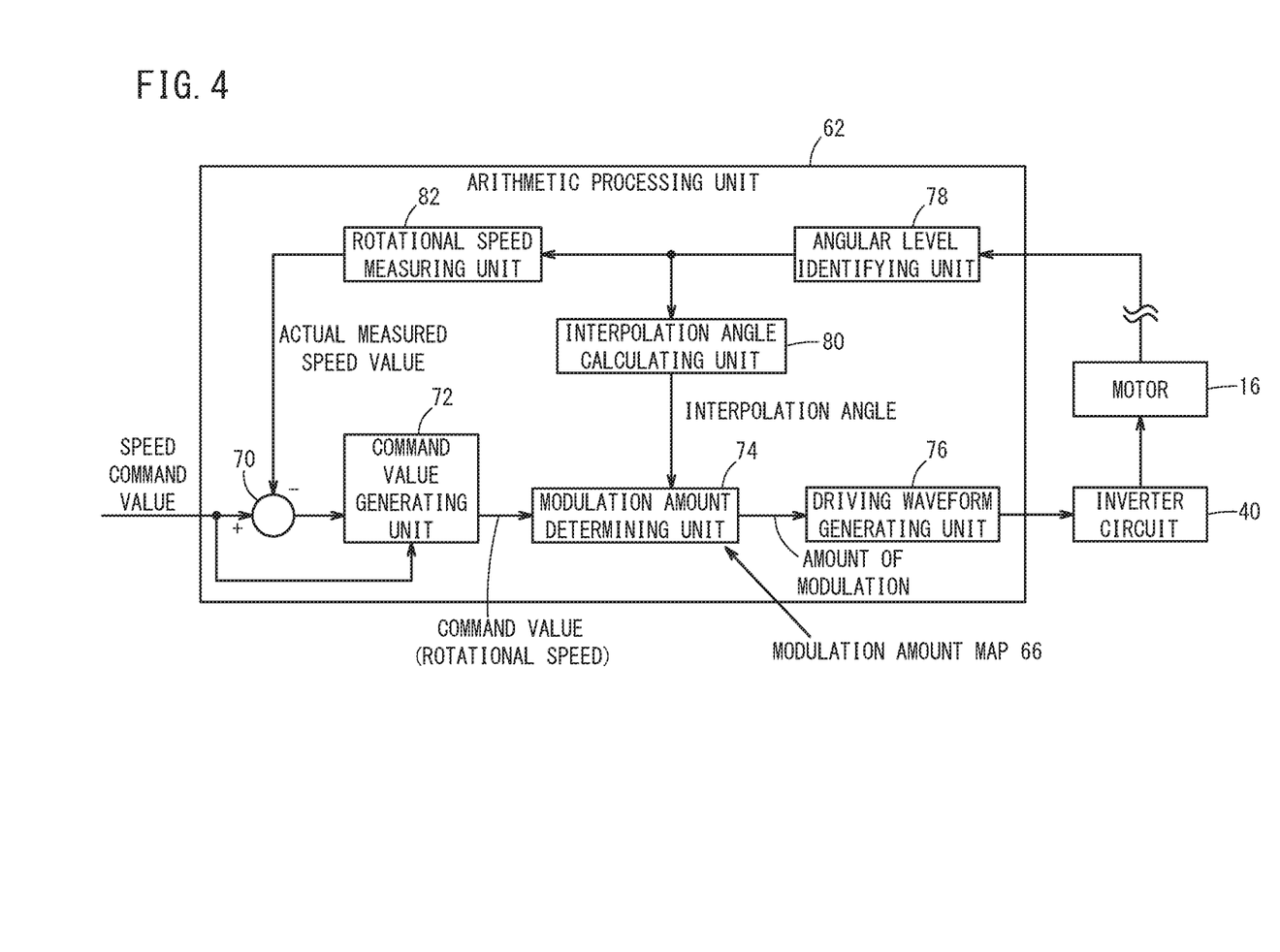
FIG. 4 is a functional block diagram of an arithmetic processing unit depicted in FIG. 3.

FIG. 4 is a functional block diagram of the arithmetic processing unit 62 depicted in FIG. 3. By reading and executing a program stored in a storing unit including the nonvolatile memory 64, this arithmetic processing unit 62 functions as a subtractor 70, a command value generating unit 72, a modulation amount determining unit 74, a driving waveform generating unit 76, an angular level identifying unit 78, an interpolation angle calculating unit 80, and a rotational speed measuring unit 82.

The subtractor 70 receives the speed command value from the integrated ECU 20 and an actual measured speed value from the rotational speed measuring unit 82, and outputs a value (hereinafter, a speed deviation) obtained by subtracting the actual measured speed value from the speed command value.

The command value generating unit 72 generates a command value (here, a target rotational speed) indicating the torque of the motor 16 by using the speed command value from the integrated ECU 20 and the speed deviation from the subtractor 70.

The modulation amount determining unit 74 converts the rotational speed from the command value generating unit 72 into the amount of pulse modulation (hereinafter referred to simply as "the amount of modulation") by reading the modulation amount map 66 from the nonvolatile memory 64 and referring to the modulation amount map 66. Here, the modulation amount map 66 is conversion information having at least an interpolation angle as an input variable and also having the amount of modulation as an output variable, and is prepared in accordance with the type of motor 16.

The driving waveform generating unit 76 generates a driving waveform of the inverter circuit 40, which is suitable for pseudo sinusoidal wave control, based on the amount of modulation from the modulation amount determining unit 74. Specifically, the driving waveform generating unit 76 generates a driving waveform in each of the U phase, the V phase, and the W phase by performing pulse modulation on a rectangular driving waveform by the amount of modulation obtained by the modulation amount map 66, and supplies these driving waveforms to the switching elements 52 and 54 corresponding to the U phase, the V phase, and the W phase. Here, when pulse modulation is performed by using pulse-width modulation (PWM) control, the amount of modulation corresponds to a duty ratio.

The angular level identifying unit 78 identifies a discrete angular level based on the level signal indicating the angular level of the motor 16. For example, if the angular resolution is 60 degrees, the discrete angular level is identified as one of the angular levels: 0, 60, 120, 180, 240, and 300 degrees.

The interpolation angle calculating unit 80 calculates an interpolation angle indicating the angle of rotation of the motor 16 by interpolating the angular level from the angular level identifying unit 78, and supplies this interpolation angle to the modulation amount determining unit 74 and the rotational speed measuring unit 82. The interpolation angle calculating unit 80 may calculate the above-described interpolation angle by using various calculation methods including the method described in Japanese Patent No. 5502605, for example.

The rotational speed measuring unit 82 measures the rotational speed of the motor 16 by dividing the amount of change in the interpolation angle before and after a sampling time by the sampling time. Then, the rotational speed measuring unit 82 supplies the measured rotational speed (hereinafter, the actual measured speed value) to the subtractor 70.

Figure 5:
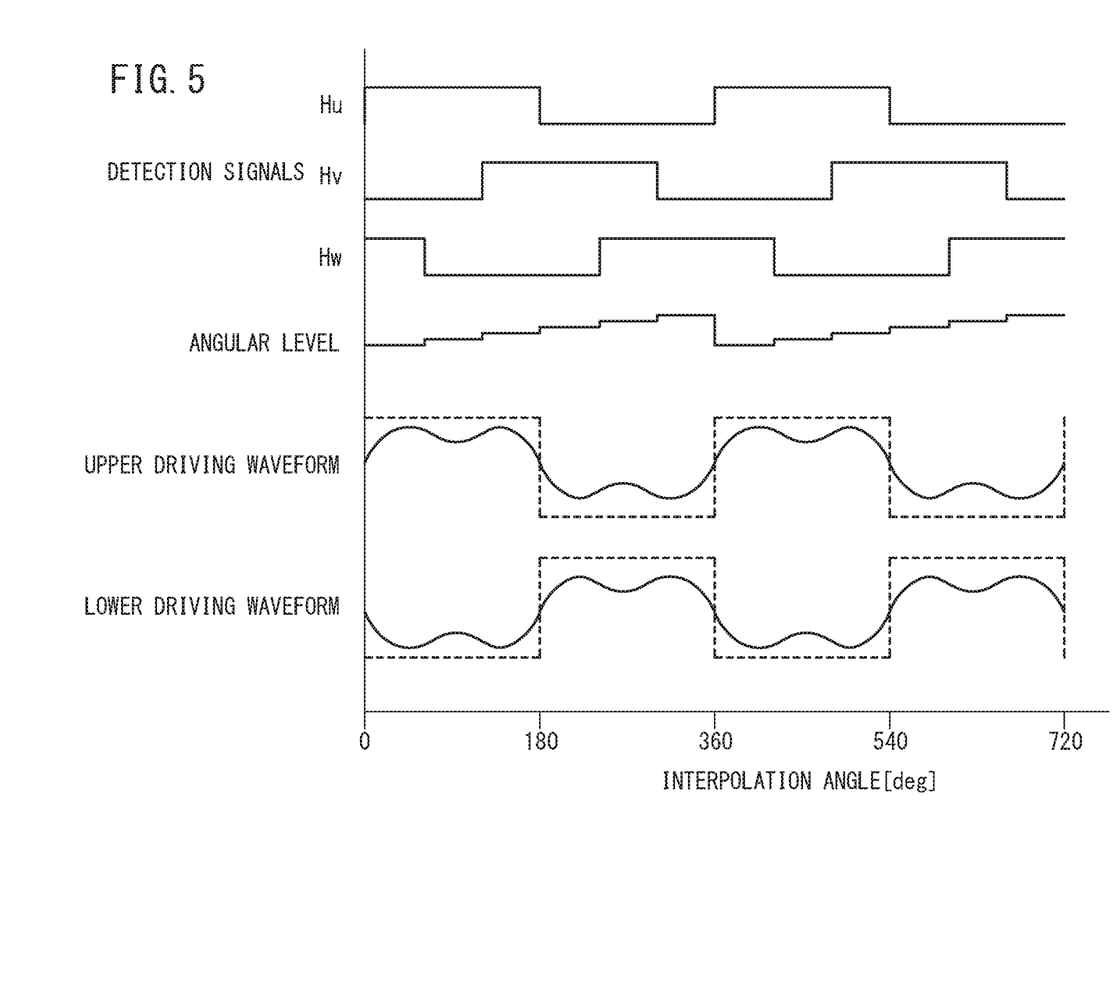
FIG. 5 is a waveform diagram of detection signals, an angular level, and driving waveforms.

FIG. 5 is a waveform diagram of the detection signals, the angular level, and the driving waveforms. More specifically, FIG. 5 shows, beginning at the top, the detection signals of "Hu", "Hv", and "Hw", the angular level, the upper driving waveform of the U phase, and the lower driving waveform of the U phase.

In the case of "rectangular wave control", rectangular driving waveforms (indicated by dashed lines), which are mutually opposite in phase, are generated. On the other hand, in the case of "pseudo sinusoidal wave control", by performing pulse modulation on the rectangular driving waveforms based on the modulation amount map 66, driving waveforms (indicated by solid lines) each having a pseudo sinusoidal shape are obtained.

The driving waveforms of the V phase correspond to waveforms obtained by advancing the phases of the driving waveforms of the U phase by 120 degrees. Likewise, the driving waveforms of the W phase correspond to waveforms obtained by delaying the phases of the driving waveforms of the U phase by 120 degrees.

[Method of Creating Modulation Amount Map 66]

Next, a method of creating the modulation amount map 66 (FIG. 3) will be described with reference to FIGS. 6 to 11.

<General Outline of Mathematical Model>

Figure 6:
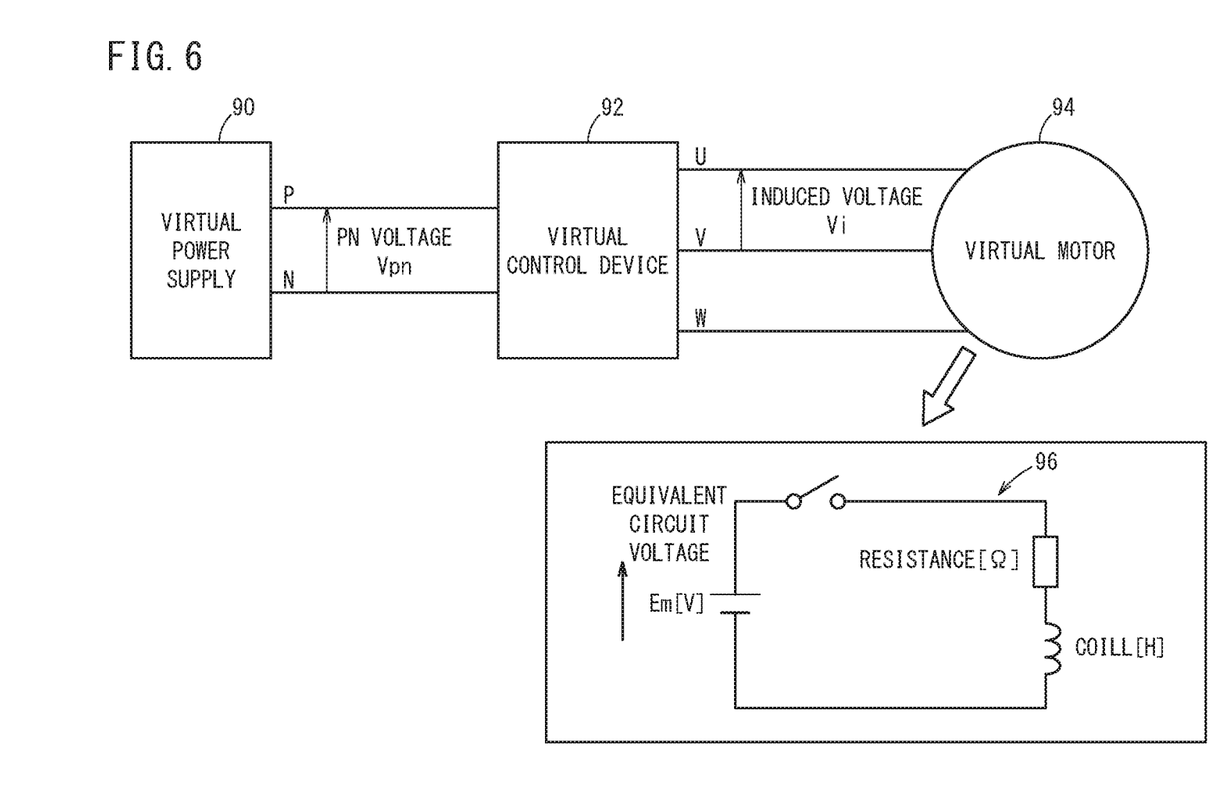
FIG. 6 is a diagram depicting a mathematical model for deriving a modulation amount map.

FIG. 6 is a diagram depicting a mathematical model for deriving the modulation amount map 66. This model depicts a state in which a virtual power supply 90, a virtual control device 92, and a virtual motor 94 are connected in series from the left side to the right side. The virtual power supply 90 corresponds to the direct-current power supply 42 of FIG. 3, and the virtual control device 92 corresponds to the inverter circuit 40 and the drive circuit 44. Moreover, the virtual motor 94 corresponds to the motor 16 of FIG. 3 and is depicted as an equivalent circuit 96 configured as an RL series circuit which is provided between the phases.

Here, a voltage (which will be hereinafter referred to as a PN voltage) between the positive pole (P) and the negative pole (N) of the virtual power supply 90 is denoted by Vpn, and an induced voltage between the U phase and the V phase of the motor 16 is denoted by Vi. Moreover, an equivalent circuit voltage in the equivalent circuit 96 between the U phase and the V phase is denoted by Em.

Figure 7A:
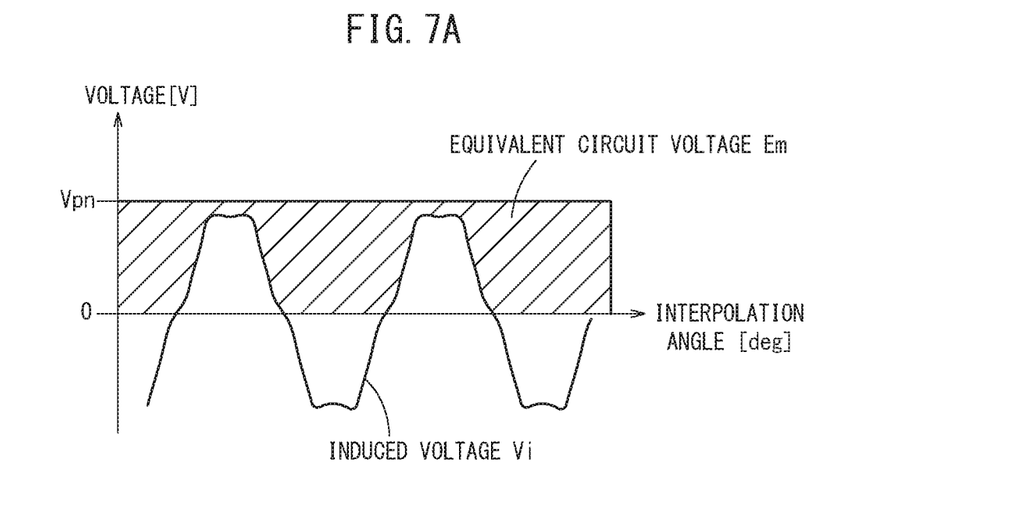
FIG. 7A is a diagram schematically showing the relationship between a PN voltage, an induced voltage, and an equivalent circuit voltage.

FIG. 7A is a diagram schematically showing the relationship between the PN voltage Vpn, the induced voltage Vi, and the equivalent circuit voltage Em. The horizontal axis of the graph represents the interpolation angle (unit: deg) and the vertical axis of the graph represents the voltage (unit: V).

It is assumed that the PN voltage Vpn is obtained as the sum of the induced voltage Vi and the equivalent circuit voltage Em. Then, the equivalent circuit voltage Em corresponds to a voltage difference (Vpn−Vi) or 0, whichever is greater, that is, a hatched region.

Figure 7B:
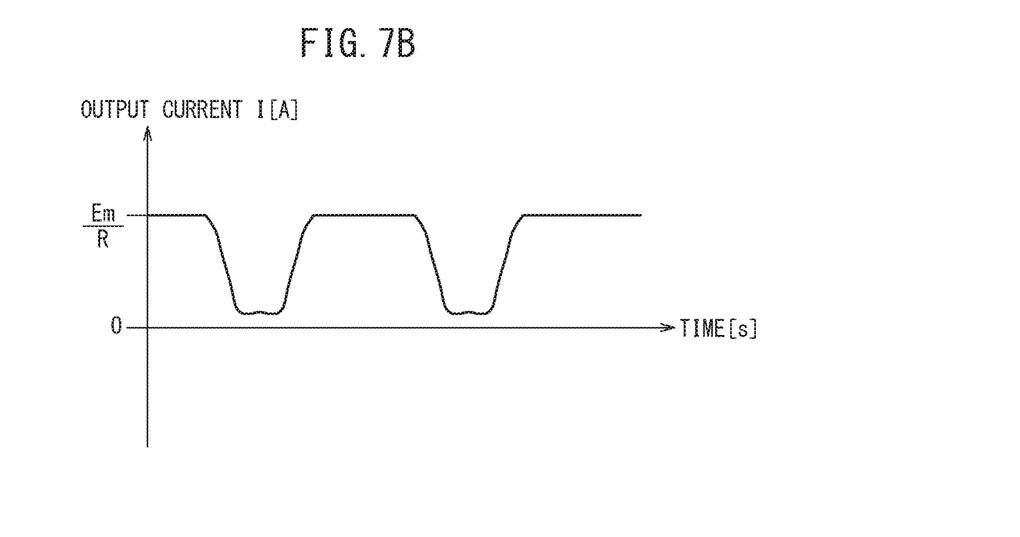
FIG. 7B is a diagram showing temporal change in an output current of an inverter circuit.

FIG. 7B is a diagram showing temporal change in an output current I of the inverter circuit 40. The horizontal axis of the graph represents the time (unit: s) and the vertical axis of the graph represents the output current I (unit: A). The output current I is a value obtained by dividing the equivalent circuit voltage Em of FIG. 7A by a resistance value R and has a waveform similar to the above-described hatched region.

Here, the modulation amount map 66 is considered to have a shape corresponding to the waveform of this output current I. That is, it is assumed that the balance of frequency components (that is, the relative relationship between spectral intensities) of the modulation amount map 66, except a bias (zero frequency), agrees with that of the output current I.

<Specific Creation Procedure>

Next, a specific creation procedure of the modulation amount map 66 will be described in detail with reference to a flowchart of FIG. 8 and FIGS. 9A to 11.

Figure 8:
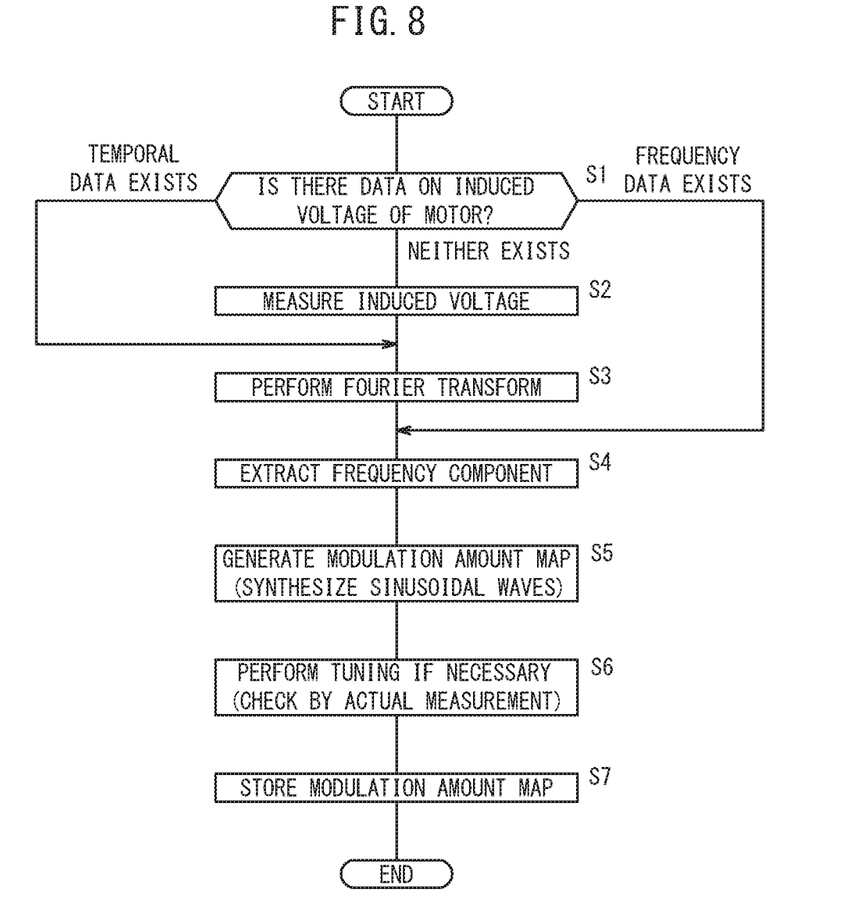
FIG. 8 is a flowchart of a method of creating the modulation amount map.

In Step S1 of FIG. 8, the operator judges whether or not there is data (an existing published value or an actual measured value) on the induced voltage Vi of the motor 16. In this judgment, there are three cases: [1] a case where there is only temporal data, [2] a case where there is only frequency data, and [3] there is neither temporal data nor frequency data.

If there is only temporal data (Step S1: TEMPORAL DATA EXISTS), Step S2 is skipped and the procedure proceeds to Step S3. If there is only frequency data (Step S1: FREQUENCY DATA EXISTS), Steps S2 and S3 are skipped and the procedure proceeds to Step S4. On the other hand, if there is neither temporal data nor frequency data (Step S1: NEITHER EXISTS), the procedure proceeds to the next Step S2.

In Step S2, the operator measures the induced voltage Vi of a controlled object or the motor 16 of the same type as the controlled object by using an unillustrated measuring jig. More specifically, the operator measures the induced voltage Vi which is generated when the motor 16 is rotated while being subjected to an external force. As a result, the computer 68 acquires, as temporal data, detection signals from the voltage sensors connected between the phases.

Figure 9A:
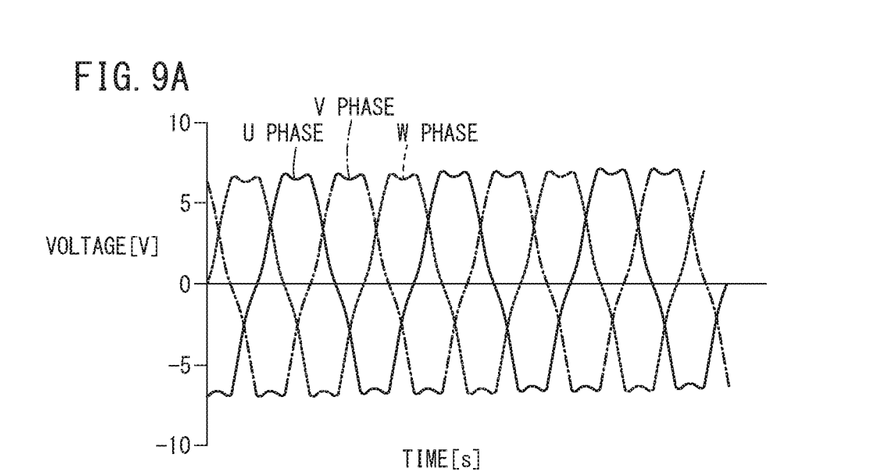
FIG. 9A is a diagram showing an example of temporal data of the induced voltage.

FIG. 9A is a diagram showing an example of temporal data of the induced voltage Vi. In the example of FIG. 9A, the induced voltages Vi in the phases have periodical waveforms having substantially the same shape, and the phases thereof are different from one another by 120 degrees.

In Step S3, the operator performs Fourier transform on the temporal data of the induced voltage Vi obtained in Step S1 or S2 by using the computer 68. Specifically, the computer 68 performs Fast Fourier transform (FFT) on the temporal data by calculation functions of various applications software in accordance with an operation which is performed by the operator.

Figure 9B:
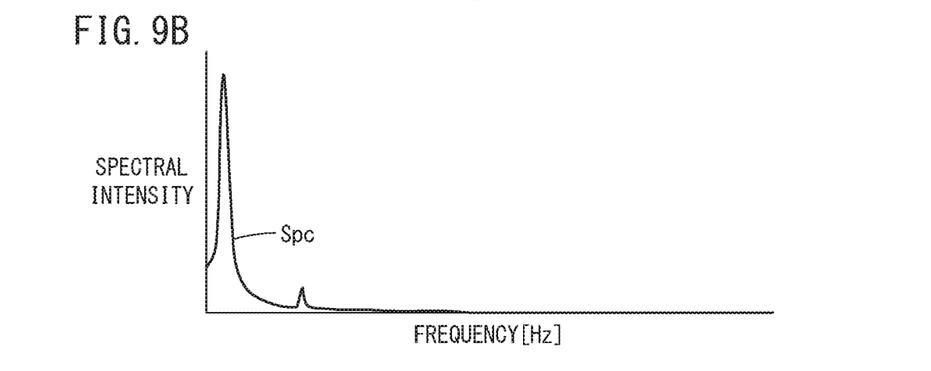
FIG. 9B is a diagram showing an example of frequency data of the induced voltage.

FIG. 9B is a diagram showing an example of frequency data of the induced voltage Vi. The horizontal axis of the graph represents the frequency (unit: Hz) and the vertical axis of the graph represents the spectral intensity (unit: dimensionless). The spectrum Spc shown in FIG. 9B at least has a peak at a frequency (hereinafter, a fundamental frequency) corresponding to one turn of the motor 16 and another peak at a frequency (hereinafter, a three-fold frequency or third harmonic frequency) corresponding to three turns of the motor 16.

In Step S4, the operator extracts a specific frequency component from the frequency data of the induced voltage Vi obtained in Step S1 or S3 by using the computer 68. Specifically, after extracting a frequency corresponding to the maximum peak of the spectrum Spc as a "fundamental frequency", the computer 68 extracts each of (2n+1)-fold frequencies (n≥1) of the fundamental frequency.

Here, with consideration given to the rotational symmetry of the motor 16, only a component with an odd order is extracted. That is, a frequency component other than a (2n+1)-fold frequency (n=0, 1, . . . ) is considered as noise whose reproducibility associated with the rotation of the motor 16 is low, and is removed.

Figure 9C:
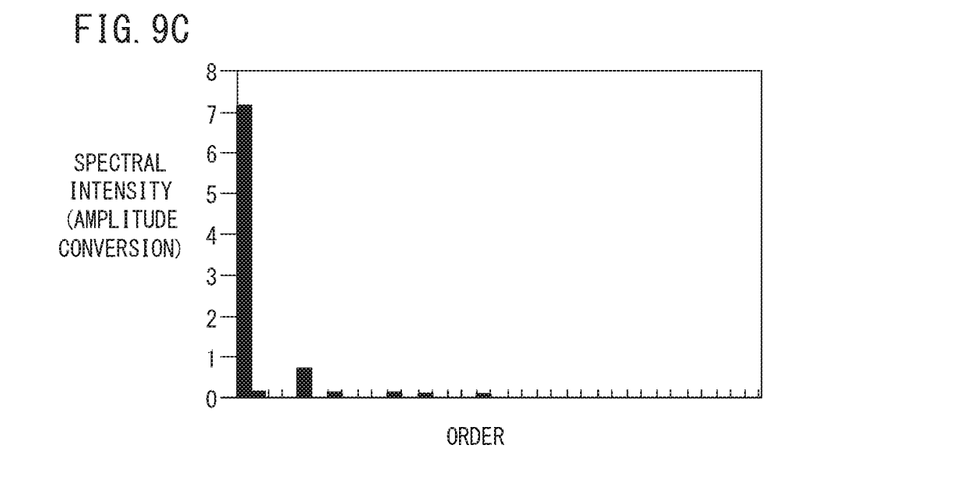
FIG. 9C is a diagram showing the result of extraction of frequency components from the frequency data of FIG. 9B.

FIG. 9C is a diagram showing the result of extraction of frequency components from the frequency data of FIG. 9B. The horizontal axis of the graph represents the order (unit: dimensionless) and the vertical axis of the graph represents the spectral intensity (unit: dimensionless) subjected to amplitude conversion. The "amplitude conversion" is an arithmetic processing for taking the square root of the spectral intensity (i.e., raising the spectral intensity to the ½ power).

In Step S5, the operator generates the modulation amount map 66 from the frequency components extracted in Step S4 by using the computer 68. Specifically, the computer 68 generates the modulation amount map 66 by synthesizing the sinusoidal waves with the same phase and different frequencies (orders). In this case, the graph depicted in FIG. 9C shows the amplitude of the sinusoidal wave corresponding to each order.

Figure 10:
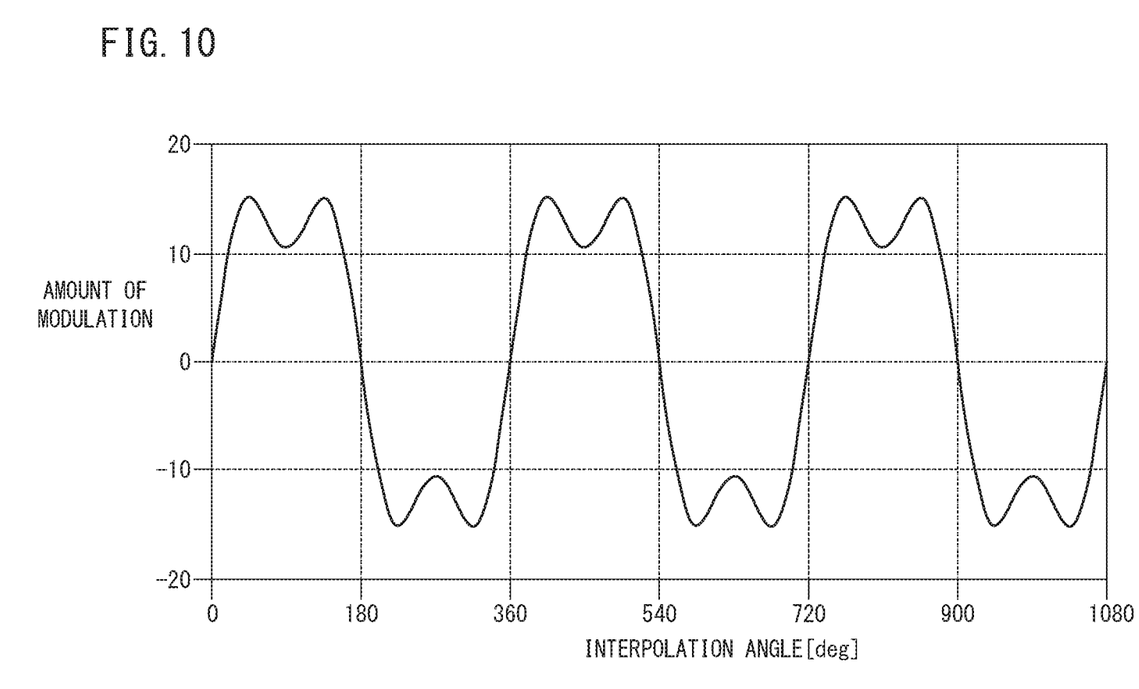
FIG. 10 is a diagram showing the result of generation of the modulation amount map based on FIG. 9C.

FIG. 10 is a diagram showing the result of generation of the modulation amount map 66 based on FIG. 9C. The horizontal axis of the graph represents the interpolation angle (unit: deg) and the vertical axis of the graph represents the amount of modulation (unit: dimensionless). As is understood from FIG. 10, the modulation amount map 66 has the shape of a periodical curve including the components of the fundamental frequency and odd-order harmonic frequencies of the fundamental frequency.

In Step S6, the operator tunes the modulation amount map 66 generated in Step S5 if necessary by actually using the motor 16. More specifically, the computer 68 acquires the output current I from the current sensors connected to the U phase, the V phase, and the W phase under a condition where rotation control of the motor 16 is being performed by using this modulation amount map 66.

Figure 11:
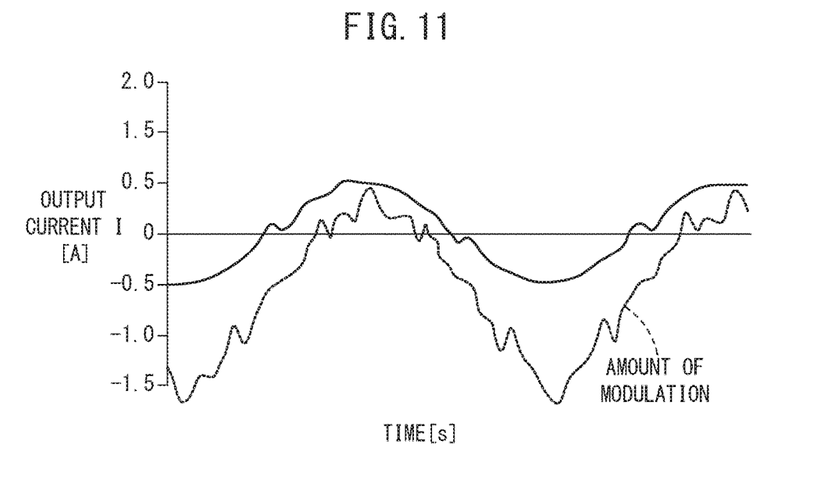
FIG. 11 is a diagram showing the relationship between the modulation amount map and the output current.

FIG. 11 is a diagram showing the relationship between the modulation amount map 66 and the output current I. In FIG. 11, the angle dependence of the amount of modulation is indicated by a dashed-line graph, and the angle dependence of the output current I is indicated by a solid-line graph. Thus, by using an appropriate modulation amount map 66 in accordance with the characteristics of the motor 16, it is possible to obtain the waveform of the output current I which is close to a planned or desired waveform.

Then, the computer 68 determines whether or not the waveform of the obtained output current I is approximate to an ideal shape (that is, a sinusoidal wave). If an ideal waveform is not obtained, the graph (individual absolute values or an overall relative value) of FIG. 9C may be fine-tuned so as to bring the waveform close to an ideal waveform.

In Step S7, the operator sets the modulation amount map 66 tuned in Step S6 by using the computer 68. Specifically, in accordance with an operation which is performed by the operator, the computer 68 supplies, to the motor control device 18, the modulation amount map 66 to be applied. Then, the motor control device 18 writes the modulation amount map 66 into the nonvolatile memory 64 of the drive circuit 44, whereby storage of the modulation amount map 66 is completed.

[Effects of Motor Control Device 18]

As described above, the motor control device 18 is [1] a device that performs rotation control of the motor 16 (the rotary electric machine) by supplying a driving waveform to the inverter circuit 40. The motor control device 18 includes: [2] a plurality of Hall sensors 32 (rotation angle sensors) fixedly disposed along the rotational direction A of the motor 16 and configured to output detection signals in accordance with the angle of rotation of the motor 16; [3] the interpolation angle calculating unit 80 configured to calculate an interpolation angle indicating the angle of rotation by interpolating a discrete angular level which is identified based on combination of the detection signals; [4] the modulation amount determining unit 74 configured to determine the amount of modulation based on the calculated interpolation angle; and [5] the driving waveform generating unit 76 configured to generate a driving waveform by performing pulse modulation by the determined amount of modulation, and [6] the modulation amount determining unit 74 determines the amount of modulation in accordance with the induced voltage Vi of the motor 16.

Moreover, a control method of the motor 16, which is performed by using the motor control device 18, [1] performs rotation control of the motor 16 by supplying a driving waveform to the inverter circuit 40. The control method includes the steps of: [2] acquiring detection signals in accordance with the angle of rotation of the motor 16 by using a plurality of Hall sensors 32 (rotation angle sensors) fixedly disposed along the rotational direction A of the motor 16; [3] calculating an interpolation angle indicating the angle of rotation by interpolating a discrete angular level which is identified based on combination of the detection signals; [4] determining the amount of modulation based on the calculated interpolation angle; and [5] generating a driving waveform by performing pulse modulation by the determined amount of modulation, and [6] in the determining step, the amount of modulation is determined in accordance with the induced voltage Vi of the motor 16.

In particular, when the relatively inexpensive motor 16 (a combination of a brushless motor and Hall sensors) depicted in FIG. 2 is used, a problem can occur that responsiveness and the positional accuracy are decreased. To address this problem, the amount of modulation of a driving waveform is determined in accordance with the induced voltage Vi of the motor 16, and thus it is possible to reflect the induced voltage Vi highly correlated with the output characteristics in the amount of modulation. Therefore, it is possible to design output characteristics as planned, while achieving simplification of a circuit configuration and a reduction in cost of the device. That is, it is possible to improve the controllability of the motor 16 without adopting an expensive device configuration (adding a high-resolution position sensor, for example).

Furthermore, the motor control device 18 may further include the nonvolatile memory 64 (the map storing unit) configured to store the modulation amount map 66 having the interpolation angle as an input variable and the amount of modulation as an output variable. The modulation amount determining unit 74 may determine the amount of modulation by reading the modulation amount map 66 from the nonvolatile memory 64 and referring to the modulation amount map 66. By reading the modulation amount map 66 stored in advance and referring to the modulation amount map 66, it is possible to obtain the amount of modulation directly without performing calculation every single time.

Furthermore, the nonvolatile memory 64 (the map storing unit) may store the modulation amount map 66 generated based on the frequency characteristics (the spectrum Spc of FIG. 9B) of the induced voltage Vi.

[Supplemental Remarks]

It goes without saying that this invention is not limited to the embodiment described above, and any changes or modifications can be made thereto within the scope of this invention. Alternatively, the configurations can be arbitrarily combined unless a technical contradiction arises.

For example, in the present embodiment, an example in which the motor 16 (an electric motor) is applied to the automated guided vehicle 10 has been described; however, the type and use application of the rotary electric machine are not limited to the above combination. For example, in addition to the motor 16, the type of rotary electric machine may be a generator or a motor generator. Moreover, the rotary electric machine may be applied to an electric vehicle including a hybrid vehicle, an electric vehicle, a fuel-cell vehicle, an electric motorcycle, and an electric bicycle, or industrial facilities.

What is claimed is:

1. A control device for performing rotation control of a rotary electric machine by supplying a driving waveform to an inverter circuit, the control device comprising:

a plurality of rotation angle sensors fixedly disposed along a rotational direction of the rotary electric machine and configured to output detection signals in accordance with an angle of rotation of the rotary electric machine;

an interpolation angle calculating unit configured to calculate an interpolation angle indicating the angle of rotation by interpolating a discrete angular level which is identified based on combination of the detection signals obtained by the plurality of rotation angle sensors;

a modulation amount determining unit configured to determine an amount of modulation based on the interpolation angle calculated by the interpolation angle calculating unit; and a driving waveform generating unit configured to generate the driving waveform by performing pulse modulation by the amount of modulation determined by the modulation amount determining unit, wherein the modulation amount determining unit determines the amount of modulation in accordance with an induced voltage of the rotary electric machine.

2. The control device according to claim 1, further comprising:

a map storing unit configured to store a modulation amount map having the interpolation angle as an input variable and the amount of modulation as an output variable, wherein the modulation amount determining unit determines the amount of modulation by reading the modulation amount map from the map storing unit and referring to the modulation amount map.

3. The control device according to claim 2, wherein the map storing unit stores the modulation amount map generated based on frequency characteristics of the induced voltage.

4. A control method of performing rotation control of a rotary electric machine by supplying a driving waveform to an inverter circuit, the control method comprising the steps of:

acquiring detection signals in accordance with an angle of rotation of the rotary electric machine by using a plurality of rotation angle sensors fixedly disposed along a rotational direction of the rotary electric machine;

calculating an interpolation angle indicating the angle of rotation by interpolating a discrete angular level which is identified based on combination of the detection signals obtained by the plurality of rotation angle sensors;

determining an amount of modulation based on the calculated interpolation angle; and generating the driving waveform by performing pulse modulation by the determined amount of modulation, wherein, in the determining step, the amount of modulation is determined in accordance with an induced voltage of the rotary electric machine.

5. The control method according to claim 4, further comprising the step of:

storing a modulation amount map having the interpolation angle as an input variable and the amount of modulation as an output variable, wherein in the determining step, the amount of modulation is determined by reading the stored modulation amount map and referring to the modulation amount map.

6. The control method according to claim 5, wherein, in the storing step, the modulation amount map generated based on frequency characteristics of the induced voltage is stored.

* * * * *